Feb. 13, 1962   F. PEARSON   3,020,829
BLOWER FOR HAY BALER
Filed April 27, 1961   2 Sheets-Sheet 2
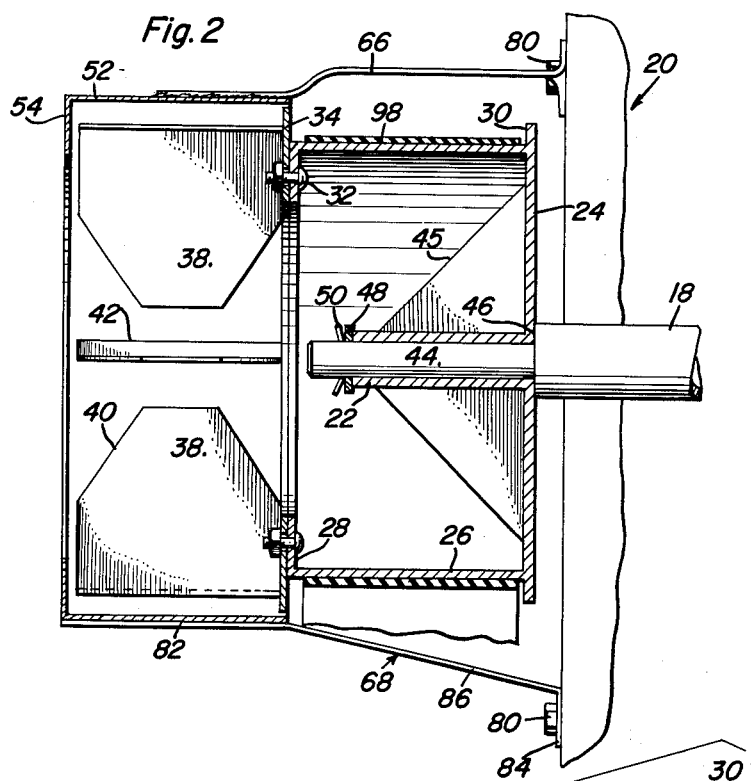
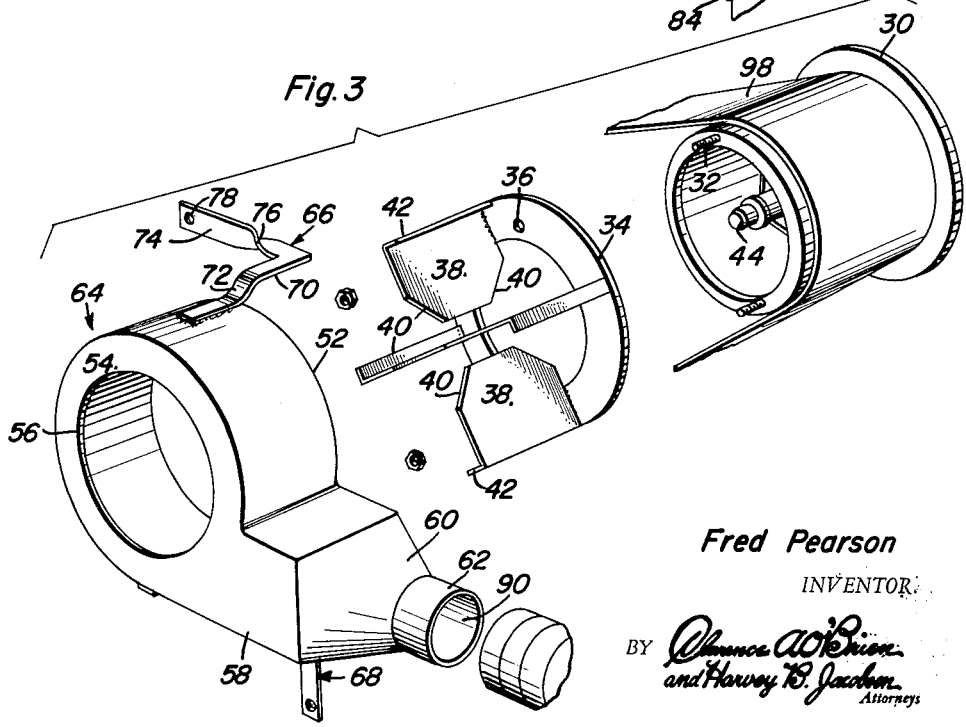
Fred Pearson
INVENTOR ns
3,020,829
BLOWER FOR HAY BALER
Fred Pearson, Box 1023, Quincy, Wash.
Filed Apr. 27, 1961, Ser. No. 106,059
7 Claims. (Cl. 100—102)

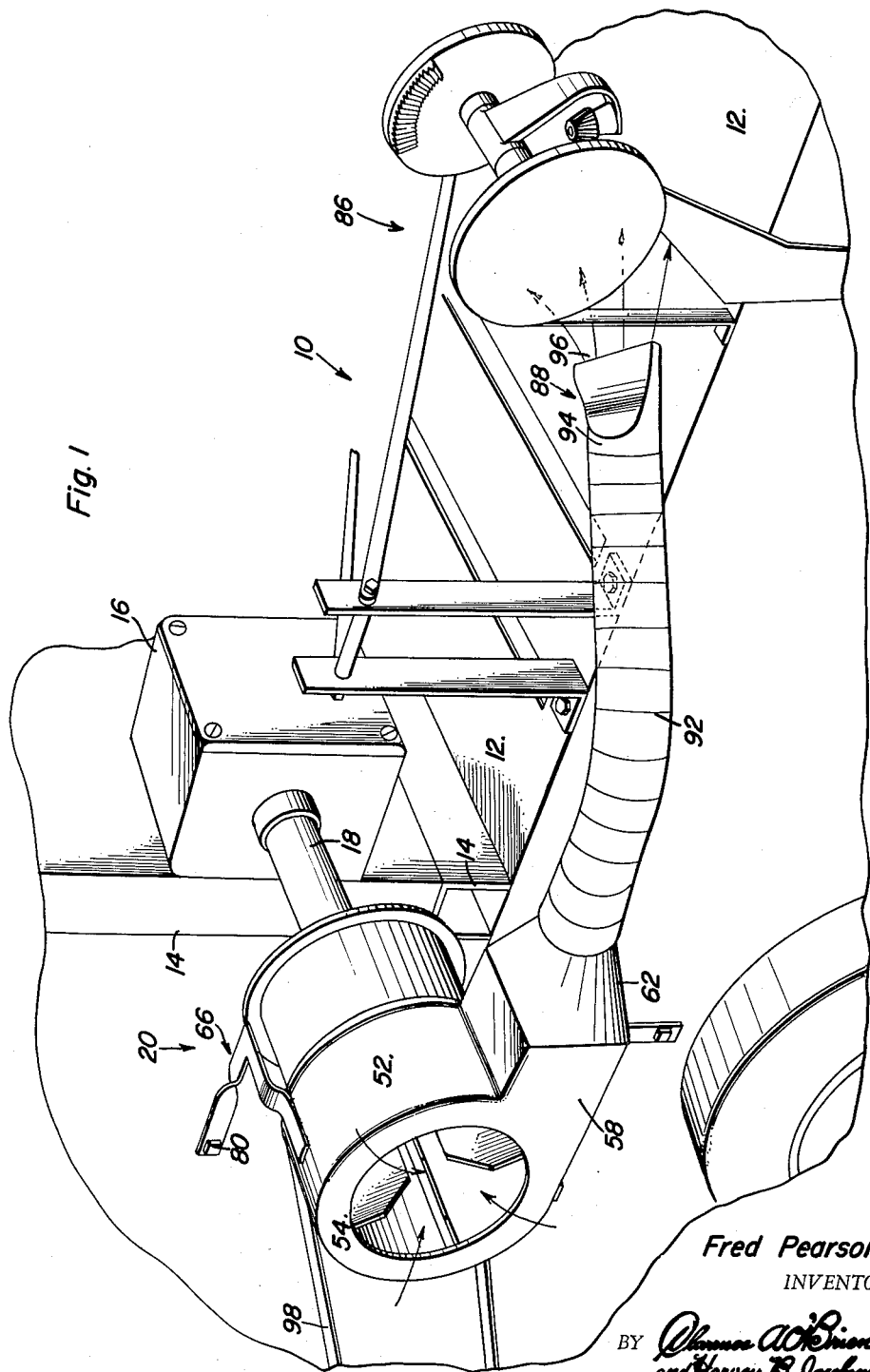

This invention relates to blowing devices, and more particularly to a device for blowing chaff and dirt out of a knotter assembly for a hay baler so as to prevent the knotter assembly from becoming clogged during operation.

During operation of conventional hay balers, extreme dficulty has been encountered due to the jamming and clogging of the knotter assembly caused by an accumulation of chaff, dirt and leaves. Briefly, this invention comprises a device for blowing away dust, dirt, leaves and chaff from the knotter assembly of any conventional hay baler. By securing a centrifugal blower to the power pulley of the hay baler, and directing the air from this blower through a nozzle onto the knotter assembly of the hay baler, jamming and clogging thereof can be prevented.

Accordingly, it is a primary object of this invention to provide a power driven blower adapted to be used on a conventional hay baler and directing the air therefrom to the knotter assembly of the hay baler by means of a nozzle so as to blow dirt and chaff away from the knotter assembly.

It is still another object of my invention to provide a blower for a hay baler designed so that the fan thereof replaces and is substituted for one of the flanges on the driving belt pulley of the hay baler.

It is still another object of my invention to provide a blower for a hay baler which is extremely simple in design, economical to manufacture, durable in use and requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing my novel blower mounted on a conventional hay baler;

FIGURE 2 is an enlarged elevational cross sectional view through the drive pulley of a hay baler with my novel blower fan mounted thereon; and FIGURE 3 is an exploded view in perspective of the blower fan, blower housing, and driving pulley.

As shown in FIGURE 1, the hay baler 10 is conventional and comprises a main frame having an upper surface 12 to which is secured an engine support 14. Mounted on the near side of the engine support 14 is a transmission 16 which is driven directly by the crankshaft of an engine by means of a shaft extending from the engine through the support 14 and into the transmission 16. The engine and its driveshaft are not shown in the drawings. The output shaft 18 from the transmission is coupled directly to a drive pulley 20.

As shown in FIGURE 2, the pulley 20 comprises a cylindrical sleeve 22 having an annular plate or flange 24 extending radially from one end thereof. Connected adjacent the outer periphery of the plate 24 and of slightly smaller diameter is a pulley cylinder 26 having a radially inwardly extending annular flange 28.

The portion 30 of the plate 24 which extends radially beyond the pulley cylinder 26 comprises a belt guide 30 which prevents the belt from moving laterally off the cylinder 26. Normally, an annular plate overlies the flange 28 and extends radially outwardly the same distance as the guide 30 so as to form a belt guide on the opposite side of the pulley. However, I remove this belt guide which is secured to the flange 28 by a plurality of bolts and nuts 32 and replace it with an annular fan support plate 34. This plate is also removably secured to the flange 28 by means of the nuts and bolts 32 in such a manner that the bolts extend through the apertures 36. Secured to the outer side of the support plate 34 are four radially extending fan plates 38 which are spaced 90° from one another. Each fan plate has its inner edges chamfered as shown at 40 and its outer edge bent over 90° to form a stiffening flange 42.

The sleeve 22 of the pulley 20 receives a reduced portion 44 of the drive shaft 18 and abuts against an annular flange 46 thereof. The sleeve 22 is drivingly connected to the reduced portion 42 by means of axially extending spline, not shown. A washer 48 fits over the shaft portion 44 and abuts the outer end of the sleeve 22, and a cotter key 50 extends through an aperture in the end of the reduced shaft portion 44 adjacent the washer 48 for preventing axial movement of the pulley on the shaft portion 44.

An annular housing 52 fits around and encloses the fan assembly, but is slightly spaced therefrom. The outer end of the housing 52 is bent inwardly to form an annular flange 54. The opening 56 in the flange 54 forms an air inlet for the fan blades 38.

The lower part of the housing 52 is bulged outwardly to form a box-like hollow extension 58 whose lower surface is tangent with the bottom periphery of the housing 52. One end of the housing portion 58 tapers outwardly to form a funnel-like housing portion 60 which is joined to a cylindrical portion 62. The complete housing 64 comprises the portions 52, 58, 60 and 62 all integrally joined together so as to form a continuous airflow passage within its hollow interior. The fan housing 64 is mounted to the frame of the hay baler by means of an L-shaped support bracket 66 which is welded to the upper portion of the housing and a lower bracket 68 which is welded to the lower part of the housing. The L-shaped bracket 66 comprises a horizontally extending portion 70 comprising two offset ends connected by a canted middle portion 72. The other leg 74 is twisted at 76 and has an aperture at 78 for receiving a bolt 80 which is threaded into a portion of the frame of the hay baler. The lower bracket 68 has a horizontally extending portion 82 and a vertically extending portion 84 connected by a canted portion 86. The portion 84 also has apertures therein for receiving bolts or studs 80 which are also threaded into a portion of the frame of the hay baler.

The knotted assembly 86 is also mounted on the upper surface of the frame 12 and knots the cord which ties the hay bales. Only a portion of the knotter assembly 86 is illustrated in the drawings, and since this assembly is of conventional construction, it is not necessary to describe this apparatus in detail. However, the knotter assembly or device does comprise a plurality of gears, levers, cams, etc. which operate in a rather intricate manner to tie the hay bales. It is this knotter assembly that has frequently caused trouble in the past by becoming clogged and jammed with chaff, leaves, dirt, etc. during the hay baling operation. For the puposе of blowing away the chaff, dirt, leaves, etc. from the knotter assembly, I provide a nozzle 88 which is connected to the outlet 90 of the blower housing 64 by means of a flexible hose 92. One end of the hose 92 is connected to the cylindrical housing portion 62, and the other end is connected to the circular portion 94 of the nozzle 88. The other end of the nozzle is flattened to form a rather wide narrow exit slot at 96 for dispersing the air blown by the fan over the various operating parts of the knotter assembly 86.

In operation, power is normally derived from an internal combustion engine which drives the transmission 16 and which in turn drives the belt 98 by means of the shaft 18 and pulley assembly 20. The hay baler derives all of its power for operating all of its parts by means of belt 98. The fan blades 38 are rotated at the same speed as the pulley, and since the blades are radially extending they act as centrifugal impellers to force the air outwardly to the inside periphery of the circular housing 52 where it is compressed. The air is drawn inwardly through the opening 56 in the flange 54 as indicated by the arrows in FIGURE 1. The pressurized air adjacent the interior of the housing 52 may escape only through the hollow rectangular housing portion 58. From the hollow housing 58, the air flows through the funnel-like portion 60 into the cylindrical portion 62 and thence into the flexible duct 92 where it exits at the nozzle 96 so as to blow on the knotter assembly 86 to remove all of the chaff, leaves, dirt etc. Since the air from the nozzle 96 effectively prevents any trash from clogging the knotter assembly 86, it is apparent that the knotter assembly will no longer become clogged due to this cause, thus eliminating one of the primary malfunctions in hay baling machinery.

While it is desired to have the nozzle assembly 88 of sufficient weight so that it will maintain any present position, it is also contemplated that the nozzle may be maintained in any preselected position by means of clamps or setscrews extending into the frame 12.

The plate 24 of pulley 30 is braced by triangular gussets 45 extending between the plate and sleeve 22. Holes may be formed in the plate 24 between the gussets for serving as additional air inlet means for fan blades 38.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a hay baler having a frame, a source of power for operating the hay baler comprising a belt pulley rotatably mounted on the frame driven by a source of power, a fan fixed directly to and rotated by the pulley, a stationary housing enclosing said fan, a knotter assembly mounted on the frame, conduit means conducting the air moved by said fan from the housing to the knotter assembly.

2. In combination, a hay baler having a frame, a source of power for operating the hay baler comprising a belt pully rotatably mounted on the frame driven by a source of power, a fan fixed directly to and rotated by the pulley, a stationary housing enclosing said fan, a knotter assembly mounted on the frame, conduit means conducting the air moved by said fan from the housing to the knotter assembly, said belt pulley comprising a pulley cylinder, means projecting radially beyond the cylinder for preventing lateral movement of a belt on the pulley including a flange fixed to one end of the cylinder and a fan fixed to the other end of the cylinder.

3. In combination, a hay baler having a frame, a source of power for operating the hay baler comprising a belt pulley rotatably mounted on the frame driven by a source of power, a fan fixed directly to and rotated by the pulley, a stationary housing enclosing said fan, a knotter assembly mounted on the frame, conduit means conducting the air moved by said fan from the housing to the knotter assembly, said fan comprising a centrifugal blower and said housing being circular.

4. In combination, a hay baler having a frame, a source of power for operating the hay baler comprising a belt pulley rotatably mounted on the frame driven by a source of power, a fan fixed directly to and rotated by the pulley, a stationary housing enclosing said fan, a knotter assembly mounted on the frame, conduit means conducting the air moved by said fan from the housing to the knotter assembly, said conduit means comprising a flexible hose and a nozzle fixed to one end of the hose.

5. In combination, a hay baler having a frame, a source of power for operating the hay baler comprising a belt pulley rotatably mounted on the frame driven by a source of power, a fan fixed directly to and rotated by the pulley, a stationary housing enclosing said fan, a knotter assembly mounted on the frame, conduit means conducting the air moved by said fan from the housing to the knotter assembly, said belt pulley comprising a pulley cylinder, means projecting radially beyond the cylinder for preventing lateral movement of a belt on the pulley including a flange fixed to one end of the cylinder and a fan fixed to the other end of the cylinder, said fan comprising a centrifugal blower and said housing being circular.

6. In combination, a hay baler having a frame, a source of power for operating the hay baler comprising a belt pulley rotatably mounted on the frame driven by a source of power, a fan fixed directly to and rotated by the pulley, a stationary housing enclosing said fan, a knotter assembly mounted on the frame, conduit means conducting the air moved by said fan from the housing to the knotter assembly, said belt pulley comprising a pulley cylinder, means projecting radially beyond the cylinder for preventing lateral movement of a belt on the pulley including a flange fixed to one end of the cylinder and a fan fixed to the other end of the cylinder, said fan comprising a centrifugal blower and said housing being circular, said conduit means comprising a flexible hose and a nozzle fixed to one end of the hose.

7. A device as defined in claim 6 wherein said circular housing includes a hollow projection tangent to its periphery, said hose connected to said hollow projection by means of a funnel shaped portion of the housing.

No references cited.